United States Patent

[11] 3,615,205

[72] Inventors Samuel E. Blum
Bronx;
Richard J. Chicotka, Jefferson Valley, both of N.Y.

[21] Appl. No. 767,367
[22] Filed Oct. 14, 1968
[45] Patented Oct. 26, 1971
[73] Assignee International Business Machines Corporation
Armonk, N.Y.

[54] METHOD FOR THE SYNTHESIS AND GROWTH OF HIGH PURITY III–V SEMICONDUCTOR COMPOSITIONS IN BULK
11 Claims, 1 Drawing Fig.

[52] U.S. Cl. .......... 23/204, 148/1.6, 252/62.3
[51] Int. Cl. .......... C01b 25/08, B01j 17/00
[50] Field of Search .......... 23/204; 148/1.6; 252/62.3

[56] References Cited
UNITED STATES PATENTS
3,305,313 2/1967 Sirgo et al. .......... 23/204

OTHER REFERENCES
Mullin et al.: " Liquid Encapsulation Techniques: The use of an inert liquid in suppressing dissociation during the melt-growth of InAs and GaAs crystals." Journal of Physics and Chemistry of Solids, Vol. 26, pp. 782–784 (1965)

*Primary Examiner*—Oscar R. Vertiz
*Assistant Examiner*—Hoke S. Miller
*Attorneys*—Hanifin and Jancin and Hansel L. McGee

ABSTRACT: Ingots of high purity III–V semiconductor compositions are prepared by encapsulating the molten Group III element with a barrier material that is permeable to the vapors of the Group V element while being impermeable to contaminants inherent in the system such as silicon and the like. The synthesis of the composition may be carried out in a conventional vertical sealed quartz enclosure. A crucible containing the Group III element and a barrier material and the Group V element are disposed within the sealed enclosure. The barrier material acts as a permeable membrane for vapors of the Group V element and as an impermeable membrane, or getter, for contaminants inherent in the system. Thus, vapors of the Group V element is permitted to diffuse through the barrier layer to react with the molten Group III element to form the III–V composition to the exclusion of contaminants. Ingots of highly pure III–V compositions are prepared in this manner.

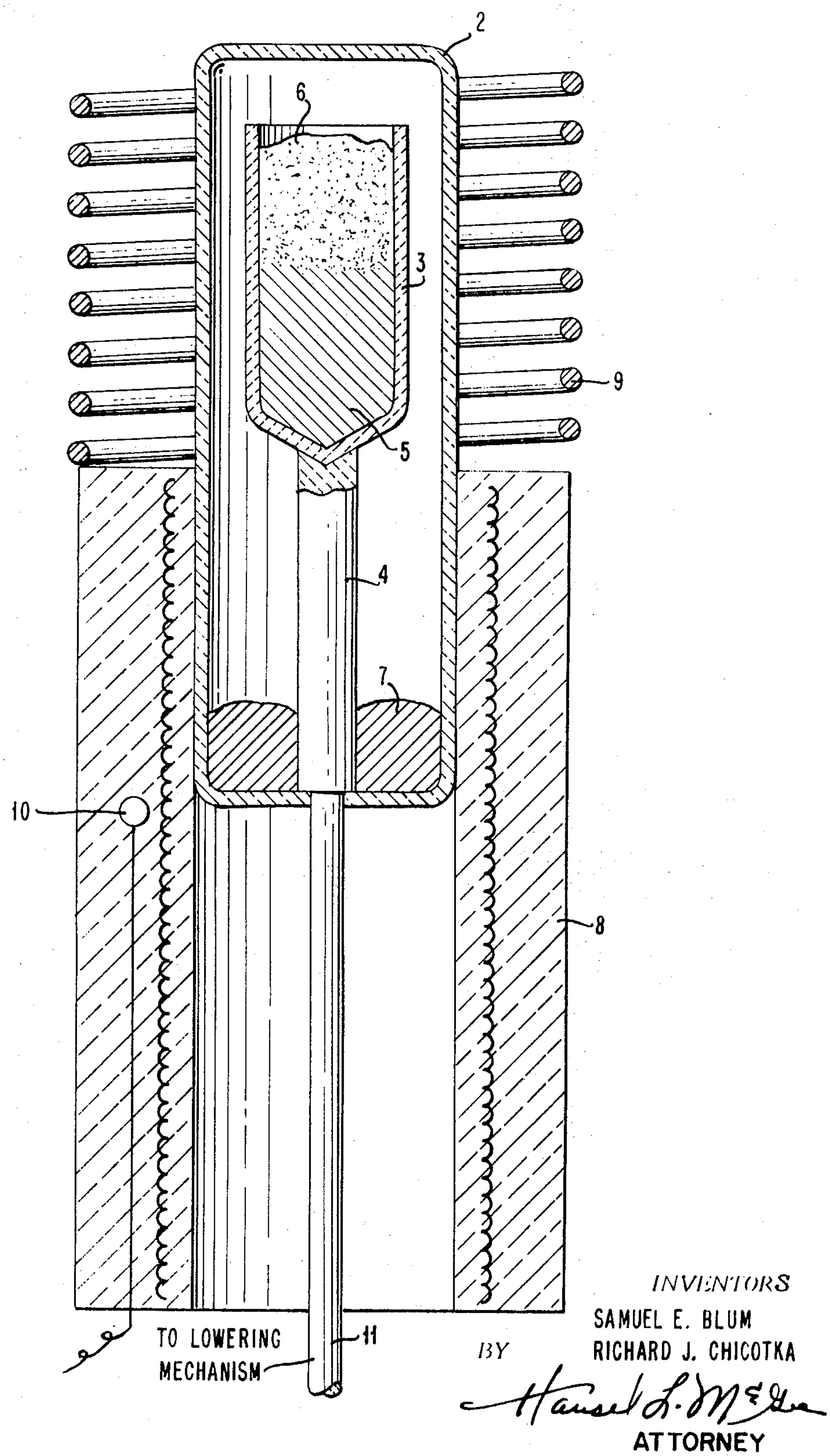
INVENTORS
SAMUEL E. BLUM
RICHARD J. CHICOTKA
BY
Hansel L. McGee
ATTORNEY

METHOD FOR THE SYNTHESIS AND GROWTH OF HIGH PURITY III–V SEMICONDUCTOR COMPOSITIONS IN BULK

BACKGROUND OF THE INVENTION

1. Field of the Invention

The invention relates to an improved method of preparing high purity III–V semiconductor compositions.

2. Description of the Prior Art

III–V compositions have emerged over recent years as a potentially useful semiconductor electroluminescent materials. Electroluminescent diodes made of these materials are most immediately promising solid state sources of visible light. They are bright and reasonably efficient sources of red and green lights, (approaching 1 percent quantum efficiency). They can be used for displays, for panel indicator lights, and as circuit failure indicator lights. These materials are also of value as source materials for use in the injection laser and Gunn devices, etc. Greater exploitation of these materials has been deterred because of the high level of contaminants that enter into the composition during its synthesis. This high level of contamination greatly decreases the efficiency of the devices made from these compositions. Further, commercially feasible methods of producing these materials in bulk are not now available.

The conventional method of preparing these compositions is by heating the reactants in a sealed enclosure. Generally, the less volatile Group III component is placed in a crucible in a sealed enclosure. The more highly volatile Group V component is located at a place remote from the crucible containing the Group III element in the same sealed enclosure. The enclosure is differentially heated such that the crucible is heated to the melting point of the compound are the area of the sealed enclosure containing the Group V element is heated at least to a temperature such that the vapor pressure of the more highly volatile component is equal to the partial vapor pressure of this component above the desired compound at the melting point of the compound. This method is exemplified in U.S. Pat. Nos. 3,366,454 and 3,366,530. The products prepared by the above method are highly contaminated by the crucible material and the container as well as by the impurities present in the component materials. Further, the crystals produced in this manner are in the form of thin dendritic platelets of various sizes and morphologies and it is difficult to form reproducibly large, uniformly dope platelets that are essential for device applications. Recently a novel method for preparing III–V compositions in bulk has been disclosed in copending U.S. Pat. application, Ser. No. 744,107 to T. S. Plaskett and assigned to the same assignee as this application. There, III–V compounds are prepared by flowing a gaseous Group V composition into a bath of a molten Group III element having a temperature profile established thereabout. Ingots of the material grown in this manner are of relatively good purity and are free of inclusions of the Group III element. Single crystals of III–V compositions have been grown by liquid encapsulation techniques in which high melting compounds having a high dissociation pressure of one of the components, e.g., GaP is encapsulated with an inert material such as $B_2O_3$. The encapsulant serves to confine the volatile component to the compositions melt and to exclude contaminants from the crystal as it is being grown. The liquid encapsulation technique, while excluding contaminants from the growing crystal, starts with a material that may be substantially impure to begin with, thus, the purity of crystal is limited by the inherently impure starting materials. While the liquid encapsulant technique has been found feasible for growing single crystal, it has not been found so in the preparation of high purity starting compositions from which the single crystals are grown. A teaching of the liquid encapsulation technique may be found in the publication to E.P.A. Metz et al. entitled "Liquid Encapsulation Techniques." The use of an inert liquid in suppressing dissociation during the melt growth of InAs and GaAs crystals, J. Phys. Chem. Solids, Vol. 26, pp. 782–7841965.

SUMMARY OF THE INVENTION

Ingots of III–V compositions of high purity are prepared by encapsulating the least volatile component of the desired composition with an inert substance, i.e., a material which is nonreactive with the components or the product, and which is capable of being permeated by the more volatile component of the desired composition while excluding contaminating substances. The synthesis is performed in a vertical Bridgman apparatus comprising a sealed quartz ampul having enclosed therein a crucible containing a charge consisting of the least volatile component and an inert substance and a source of the more volatile component remotely placed from the crucible and its charge. The crucible and its charge is heated to a temperature sufficient to cause the charge to become molten and to cause a subsequent reaction between the less volatile and more volatile component. The inert substance forms a liquid which wets the surfaces of the container and forms a liquid film on the surface of the molten metal, thus isolating it from the crucible. Subsequently, the more volatile substance is heated to produce a pressure thereof sufficient to cause it to diffuse through the barrier material and to react with the molten element. An ingot of the prepared composition is formed by freezing at rates of about 1 cm./hr.

OBJECTS OF THE INVENTION

Is is an object of the present invention to provide an improved method of preparing highly pure III–V compositions and alloys thereof in bulk.

The foregoing and other objects, features and advantages of the invention will be apparent from the following more particular description of preferred embodiments of the invention as illustrated in the accompanying drawing and examples.

FIG. 1 is a schematic drawing of a vertical Bridgman apparatus used in this invention.

DESCRIPTION OF THE PREFERRED EMBODIMENT

The method according to the invention is particularly advantageous for the production of semiconductor compositions of the type III–V; that is a composition comprising an element of the third group and an element of the fifth group of the periodic system. The method may also be applied to the production of composition of the II–VI type. Additionally, alloys of the above compositions can similarly be prepared. For example, GaAlAs, InAsP, GaAlP, etc., can be prepared by having a mixture of Group III metals in the molten state or admitting a mixture of vaporous Group V elements into the molten Group III metal.

The materials used, i.e., the Group III and Group V elements, in this invention are commercially available in relatively high purity. Among the materials that may be used for containers are crucibles prepared from Alundum, graphite, sapphire, quartz, boron-nitride, and aluminum nitride among others. In preferred embodiments of the invention boron-nitride crucibles are used because they have a low emissivity, and therefore overheating and softening of the quartz ampul is minimized. In addition, the III–V compositions does not wet boron-nitride appreciably, thus facilitates the removal of the ingot therefrom.

The method of the invention requires a barrier material that does not enter into reaction with the reactants or the product formed. It must be suitable to wet the surfaces of the crucible and in effect encapsulate the molten Group III element. Further, the barrier material must be permeable to the vapor of the Group V elements while being impervious or acts as a getter for impurities that are inherently present in the system, i.e., silicon, carbon, etc. Several such materials are available, for example, $BaCl_2$, $CaCl_2$, $BaCl_2$+KCl and $B_2O_3$. For the purposes of this invention $B_2O_3$ is the preferred barrier material.

The following examples are given by way of illustration and not by way of limitation.

EXAMPLE 1

Referring to the FIGURE a vertical Bridgman apparatus designated generally as 1 is provided. The apparatus comprises a sealed quartz tube 2 having enclosed therein a BN crucible 3, mounted on support 4. Crucible 3 contains a charge 5 consisting of 30 grams of gallium overlaid with 1–5 of $B_2O_3$,( ). At the bottom of quartz tube 2 there is deposited an excess of phosphorus 7. The lower half of quartz tube 2 is positioned within a vertical tubular furnace 8. The upper portion of the tube 2 is encircles with RF coils 9. Synthesis is achieved by heating the charge 5 and 6 inductively while slowly elevating the temperature of the phosphorus 7, and hence its pressure, until the phosphorus pressure is controlled at between 1 phosphorus and 25 atmospheres. In this experiment the pressure is controlled at 10 atmospheres. At this pressure the molten charge 5 is at about 1,500° C. The initial heating of the charge 5 causes the $B_2O_3$,(6) to melt and to encapsulate the molten Ga. After maintaining the molten charge at 1,500° C. for a time sufficient for the reaction to go to completion, e.g., about ½ to 1 hour, the molten product is solidified. Solidification is obtained either by lowering the tube 2 and phosphorus temperature control thermocouple 10, simultaneously, by means of lowering mechanism 11 or by raising RF coils 9. Clear, transparent, single phase GaP is obtained by freezing the molten product at a rate of about 1 cm./hr. Yields of about 40 grams or more of the product is obtained.

Polycrystalline N-type gallium phosphide ingots produced by the above method are sound, i.e., they are free of voids an inclusions. The crystallines are columnar and arrayed with the long axis parallel to the direction of growth. Hall measurements were made on the product and its electrical properties are taken as a measure of its purity. Measurements were made at 300° K. and at 77° C. The electrical properties of GaP synthesized as above are given in the ensuing table.

EXAMPLE 2

For comparison purposes, N types GaP is prepared as above in example 1, except that the barrier material ($B_2O_3$) is excluded from the charge. Electrical measurements were made 300° K. and at 77° K. on the product and are given in the following table.

EXAMPLE 3

N-type GaAs is prepared by the procedure disclosed in example 1 above except that arsenic is substituted for phosphorus. Electrical measurements of the product is given in the following table.

EXAMPLE 4

For comparison N-type GaAs is prepared according to the procedure of example 3 except that the barrier material ($B_2O_3$) is omitted and arsenic is substituted for phosphorus. Electrical measurements were made on the product and are reported in ensuing table.

EXAMPLE 5

The product of example 3 is heat treated according to the method of J.M. Woodall et al. as disclosed in U.S. Pat. application, Ser. No. 740,778 filed June 4, 1968 and commonly assigned. The sample is placed in a sealed evacuated chamber and heated to a temperature of about 750° C. for a period of about 48 hours. The resulting changes in electrical properties are shown in the ensuing table.

EXAMPLE 6

The product of example 4 is heat treated in the same manner as in example 5. Because the values of N (carrier concentration) as well as other electrical measurements, e.g., $\eta$, (mobility), $\rho$ (resistivity) and $R_H$ (the Hall coefficient) are dependent on the heat treating history of the specific samples, it is necessary to make all direct comparisons of the samples' electrical measurements after identical heat treatments. For this reason the samples of examples 5 and 6 are heated at about 750° C.

TABLE 1

| Example | 300° K., $\mu$, cm.²/v. sec. | $\rho$, ohm-cm. | N cm.⁻³ | $R_H$ | $\mu$, cm.²/v. sec. | 77° K., $\rho$, ohm-cm. | N cm.⁻³ | $R_H$ |
|---|---|---|---|---|---|---|---|---|
| 1 | 84 | 36.9 | $2x10^{15}$ | 3,100 | 790 | 117 | $6.8x10^{13}$ | $92x10^{3}$ |
| 2 | 93 | $5.4x10^{-2}$ | $1.2x10^{18}$ | 5.2 | 150 | 10.0 | $4.5x10^{15}$ | $1.5x10^{3}$ |
| 3 | 887 | $4.8x10^{7}$ | $2x10^{8}$ | $4.8x10^{10}$ | | | | |
| 4 | 4,130 | 0.1 | $1.6x10^{16}$ | 400 | | | | |
| 5 | 6,500 | $3.5x10^{-1}$ | $2.7x10^{15}$ | 2,270 | 22,500 | 0.14 | $1.9x10^{15}$ | 3,280 |
| 6 | 5,610 | $5.5x10^{-2}$ | $2.1x10^{16}$ | 311 | 9,040 | $4.7x10^{-2}$ | $1.5x10^{16}$ | 423 |

In comparing the electrical properties of the products disclosed herein, one necessarily compares the carrier concentrations (N) of the products, as a measure of purity, since it is determined by the number of impurities present in a given semiconductor composition. This is determined by the equation $N=n_D-n_A$, where $n_D$ and $n_A$ are the number of donor and acceptor impurities respectively present in a given composition. Generally the purer the material the lower will be $N$. For example, when $N$ for the products of examples 1 and 2, and 3 and 4 are compared, it is seen that $N$ for the products prepared by the method of this convention are lower by 2 orders of magnitude or more than the products prepared conventionally. However, while $N$ can be used as a rule of thumb indication of purity, a truer measure of purity can be obtained only by heat treating the materials which has the property of removing unidentified acceptors from the lattice of material. It is believed that these acceptors have a compensating effect in the crystal, i.e., these acceptor impurities appear to cause the carriers to be captured thereby, thus the material will show relatively high resistivities. Thus, for comparison purposes examples 3, (GaAs prepared by the method of this invention) and 4, (GaAs prepared by conventional methods), are heat treated according to the above-mentioned U.S. Pat. application, Ser. No. 740,778. As is seen in the above table, when GaAs is prepared in the conventional manner net carrier concentration (N) is in the $10^{16}$ cm.$^{13}$ range (see example 4) and has mobilities ($\rho$) of about 4,130 cm.²/volt second at room temperature. If this material is made appreciably purer, a semi-insulating material, e.g., resistivities of $\geq 10^6$ ohm-cm., results as seen in example 3. However, a semi-insulating material may also result from other processes, e.g., by doping. That is, the increased resistivity of GaAs cannot solely be taken as evidence of improved purity. As shown by Woodall et al. in the above-mentioned U.S. Pat application Ser. No. 740,778, high purity semi-insulating material when heat treated will convert to a material of low resistivity, i.e., the compensating donors become electrically inactive (precipitate). That this is so is seen by comparing example 3 with example 5 where it is seen that on heat treating, the resistivity ($\rho$) of example 3 decreases from $4.8 \times 10^7$ to $3.5 \times 10^{11}$. The material can then be directly compared to other low resistivity GaAs. Thus, the semiinsulating material prepared by the method of this invention was heat treated and its Hall measurements were compared with those of GaAs prepared conventionally and which was also heat treated. These measurements showed the material prepared by this invention to be of higher purity than that prepared by conventional methods, as shown by comparing data in the above table given for examples 5 and 6. For example, it is seen that N for the heat treated product of this invention (example 5) is at least one order of magnitude lower that for (example 6), heat treated GaAs prepared conventionally. Similarly, the resistivity of example 5 is about one order of magnitude lower, $R_H$ value is considerably high, e.g., 2,270 versus 311. The mobility ($\mu$) is about 6,500 at room temperature and increases greatly at 77° K., e.g., about triple its room temperature value. This change is appreciable and indicates an appreciable increased purity when compared to the conventionally grown material. When conventionally prepared GaAs is heat treated, $\mu$ increases only about 10 percent and little change is observed in $\rho$ and in N.

While the invention has been described above for the preparation of GaP and GaAs it should be obvious to those skilled in the art that other Group III–V compounds and alloys thereof can be similarly prepared by routinely altering the reaction temperatures and vapor pressures for the particular reaction. For example, InAs, InP, AlP, AlAs, GaAlAs, GaAlP, and the like can be prepared by the method of this invention. Similarly, it should also be obvious from the above teachings, that one skilled in the art can also prepare compounds composed of Groups II and VI elements and alloys thereof by this method.

While the invention has been particularly described with reference to a preferred embodiment thereof, it will be understood by those skilled in the art that various changes in form and detail may be made therein without departing from the spirit and scope of the invention.

What is claimed is:

1. An improved method of preparing III–V semiconductor compositions of high purity in bulk; including the steps of:

a. establishing a sealed enclosure having enclosed therein a crucible containing a Group III element and a barrier material, selected from the group consisting of $B_2O_3$, $BaCl_2$, $BaCl_2$+KCl, and $CaCl_2$ said barrier material having a lesser density than said Group III element, and a volatile group V element remotely placed from said crucible containing said group III element and said barrier material, b. heating said crucible and its contents at a temperature sufficient to cause said Group III element and said barrier material to become molten, said barrier material thereby encapsulating said molten group III element, and c. simultaneously heating said volatile Group V element to cause the same to attain a pressure sufficient to diffuse through said barrier material into said molten Group III element to react therewith, thereby forming III–V semiconductor compositions of high purity in bulk.

2. An improved method for preparing III–V semiconductor compositions according to claim 1 wherein said Group III element is selected from at least one of the group consisting of Al, Ga, and In and said Group V element is selected from at least one of the group consisting of P, As, Sb and Bi.

3. An improved method for preparing semiconductor compositions according to claim 1 wherein said group III element is Ga and said Group V element is As.

4. An improved method for preparing semiconductor compositions according to claim 1 wherein said Group III element is Ga and said Group V element is P.

5. An improved method for preparing semiconductor compositions according to claim 1 wherein said Group III element is In and said Group V element is As.

6. An improved method for preparing semiconductor compositions according to claim 1 wherein said Group III element is In and said Group V element is P.

7. An improved method for preparing semiconductor compositions according to claim 1 wherein said Group III elements are Ga and Al and said Group V element is As.

8. An improved method for preparing semiconductor compositions according to claim 1 wherein said Group III elements are Ga and A1 and said Group V element is P.

9. An improved method for preparing semiconductor compositions according to claim 1 wherein said barrier material is $B_2O_3$.

10. An improved method for preparing semiconductor compositions according to claim 1 wherein the pressure of said Group V element is maintained between 1 to 25 atmospheres.

11. An improved method for preparing semiconductor compositions according to claim 1 wherein the pressure of said Group V element is maintained at about 10 atmospheres.

* * * * *